United States Patent [19]

Dishaw et al.

[11] 4,063,219

[45] Dec. 13, 1977

[54] CHARACTER RECOGNITION SYSTEM

[75] Inventors: James Dishaw, Allen Park; Thomas R. Krause, Troy, both of Mich.

[73] Assignee: Burroughs Corporation, Detroit, Mich.

[21] Appl. No.: 754,275

[22] Filed: Dec. 27, 1976

[51] Int. Cl.² ............................................. G06K 9/12
[52] U.S. Cl. .................... 340/146.3 MA; 340/146.3 J
[58] Field of Search .......... 340/146.3 MA, 146.3 AG, 340/146.3 AE, 146.3 J, 146.3 AC

[56] References Cited

U.S. PATENT DOCUMENTS

| | | | |
|---|---|---|---|
| 3,639,902 | 2/1972 | Dietrich | 340/146.3 J |
| 3,676,847 | 7/1972 | Partin | 340/146.3 MA |
| 3,723,970 | 3/1973 | Stoller | 340/146.3 MA |
| 3,840,856 | 10/1974 | Beall et al. | 340/146.3 AG |
| 3,992,697 | 11/1976 | Knab et al. | 340/146.3 MA |

*Primary Examiner*—Leo H. Boudreau
*Attorney, Agent, or Firm*—David R. Syrowik; Carl Fissell, Jr.; Kevin R. Peterson

[57] ABSTRACT

An apparatus and method for recognizing a presented character are provided. The apparatus includes a scanner for extracting black and white information from a document in the form of an analog electrical signal. The analog electrical signal is converted into a three bit binary number by a multi-level quantizer to consequently form three weighted data field geometric configurations consisting of rows of binary signals, which binary signals are stored in a storage area in three data field arrays. A selected one of a plurality of progression word detectors detects in a sequential fashion a plurality of binary progression words or progressions by decoding predetermined combinations of the binary words from all the field arrays. The combinations of binary words represent overlapping neighborhood dependent areas from the data field array. A progression detector circuit detects the predetermined combinations of the detected progressions by means of multiplexers which group predetermined combinations of the detected progressions and binary counters which keep track of the progression times and stores the fact that a progression occurs in the proper progression.

19 Claims, 21 Drawing Figures

NORMAL ZERO

CUT ZEROS

CHARACTER RECOGNITION SYSTEM

This invention in general relates to apparatus and method for recognizing presented characters and in particular to a method and apparatus for recognizing characters which are distorted and/or mutilated.

BACKGROUND OF THE INVENTION

In recent years optical character reading systems have been employed to read a presented character from a document and to supply a general purpose computer with encoded data representing the presented character. Typical of such optical character reading system is the system disclosed in the U.S. Pat. to Beall et al, 3,840,856, issued Oct. 8, 1974. The Beall et al patent discloses apparatus for scanning a presented character to derive an array of voltages, which array of voltages are quantized at three quantizing levels to form data field geometric configurations represented by binary signals. The information content of discrete areas of the data field geometric configurations is compared in a sequential manner with predetermined voltage characters. A favorable comparison results in the discrete area being characterized as one of the predetermined voltage characters.

One disadvantage of the technique employed in the Beall et al patent is that features of the patterns are interrogated in a discrete fashion with no regard for the inter-relationships between these discrete areas of the features based upon size, such as length, heighth, and width of the character.

Another method of pattern or character recognition is matrix recognition in which an entire pattern is stored in a matrix and compared against stored patterns. While such a method has a high degree of accuracy in interrogating distorted and partial pattens, such a system is very costly and complex pattern interrogation methods must be used.

The United States Pat. to Chow, No. 3,341,814, issued Sept. 12, 1967, which has the same assignee as the subject application, discloses an improved method for identifying alpha-numeric characters or other patterns by statistical decision techniques based on nearest neighbor dependence. The subject invention uses this broad concept of neighborhood dependent areas in a novel fashion to overcome any of the problems of the prior art system, especially in regard to the recognition of distorted and mutilated patterns.

SUMMARY OF THE INVENTION

An apparatus for recognizing a presented character constructed in accordance with the instant invention includes generating means for generating binary signals representing the information content of a geometric pattern corresponding to the presented character. The apparatus also includes storage means coupled to the generating means for storing the binary signals. The binary signals represent a data field array that is in approximate conformity with the geometric pattern of the presented character. The data field array defines a matrix of binary words. Also included is a progression word detecting means for detecting a plurality of progressions by decoding predetermined combinations of the stored binary words. The combinations of the binary words represent overlapping neighborhood dependent areas from the field arrays. Progression detection means are provided for detecting predetermined combinations of the detected progressions whereby the presented character is recognized as a known type upon such detection.

Other advantages of the present invention will be readily appreciated as the same becomes better understood by reference to the following detailed description when considered in connection with the accompanying drawings wherein:

FIG. 4 is a chart representing the character "O" as it appears in the storage area, the top segment being missing;

Figure 5:
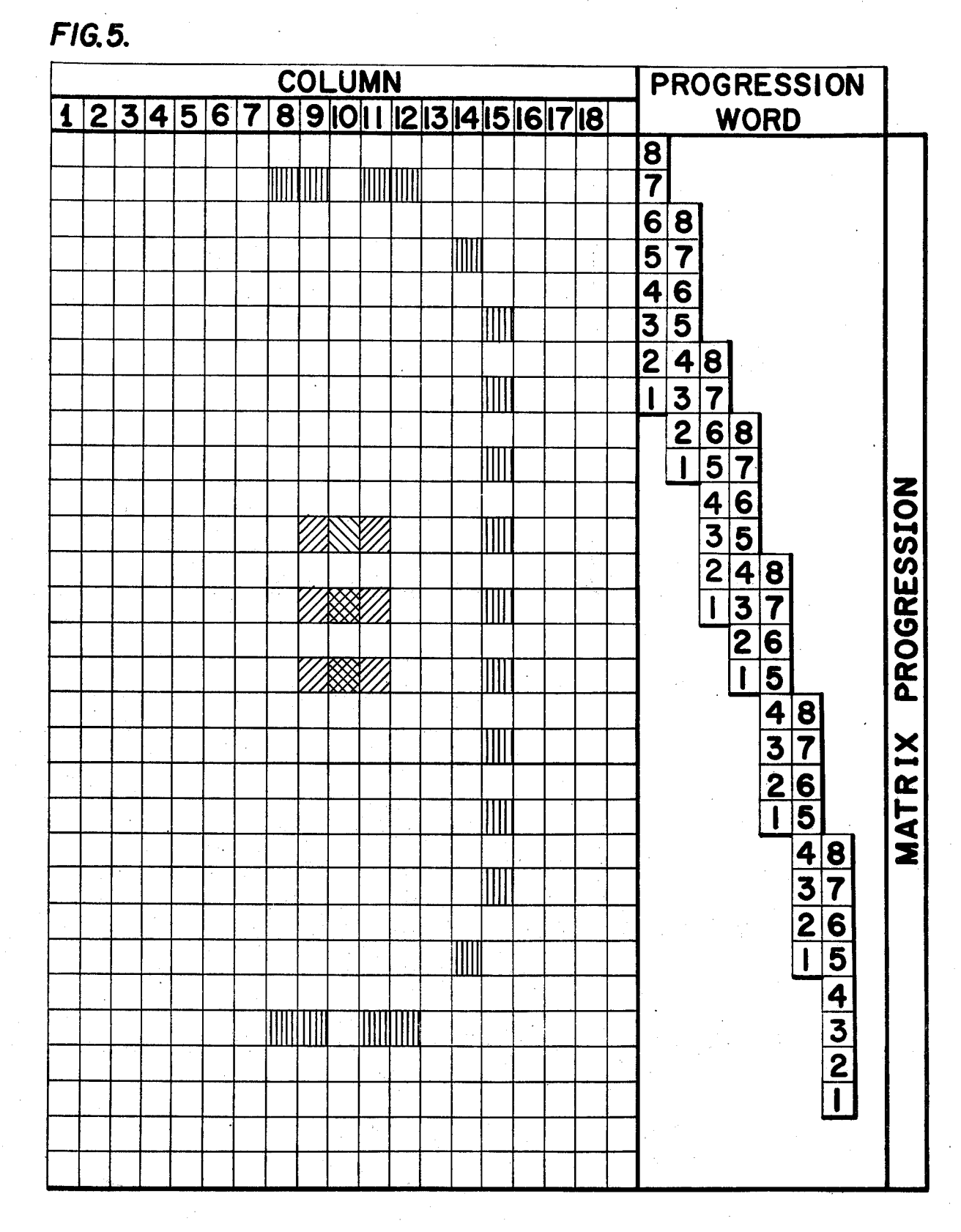

FIG. 5 is similar to FIG. 4, except that the left segment, not the top segment, is missing;

Figure 6:
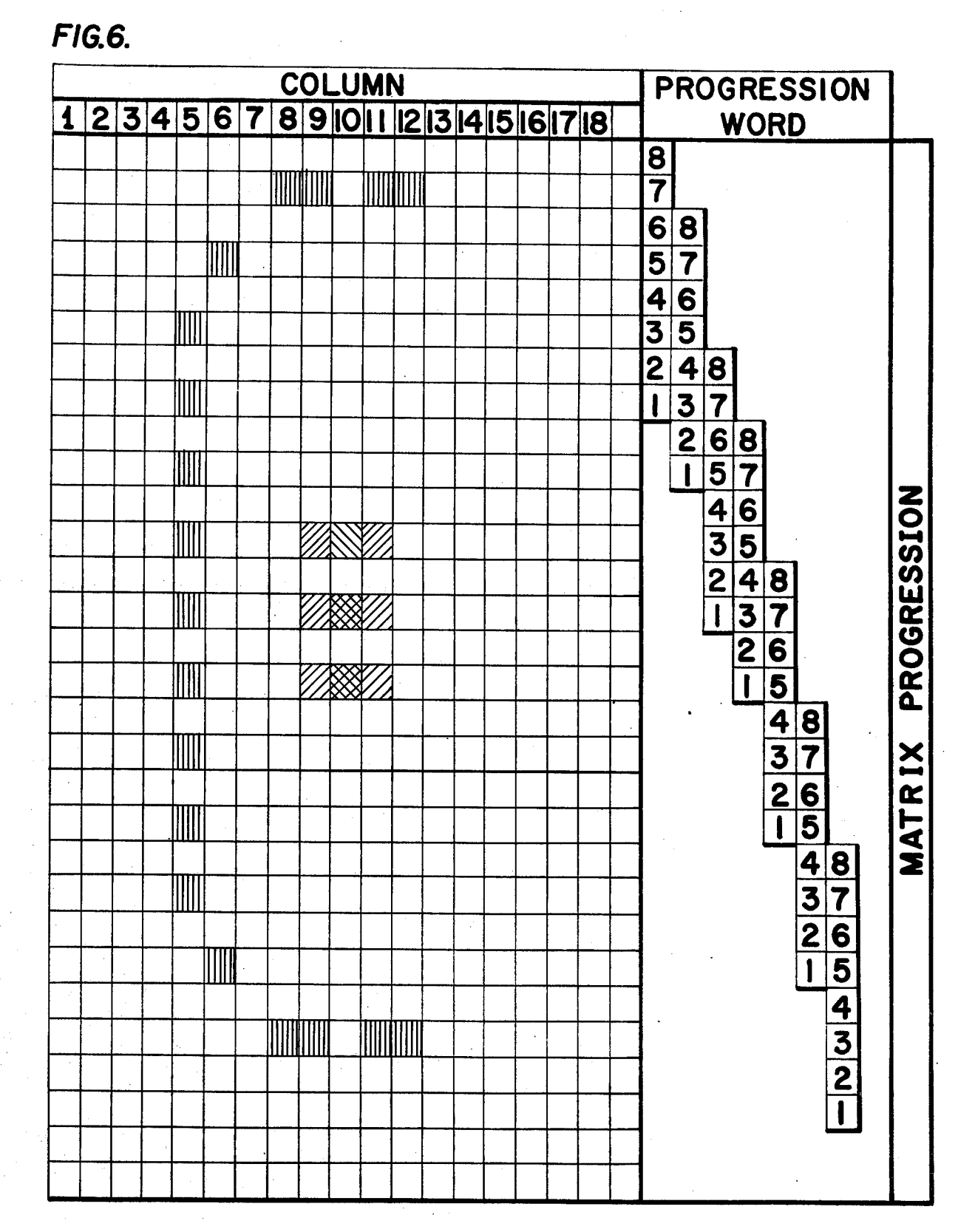

FIG. 6 is similar to FIG. 5 except that right segment is missing;

Figure 7:
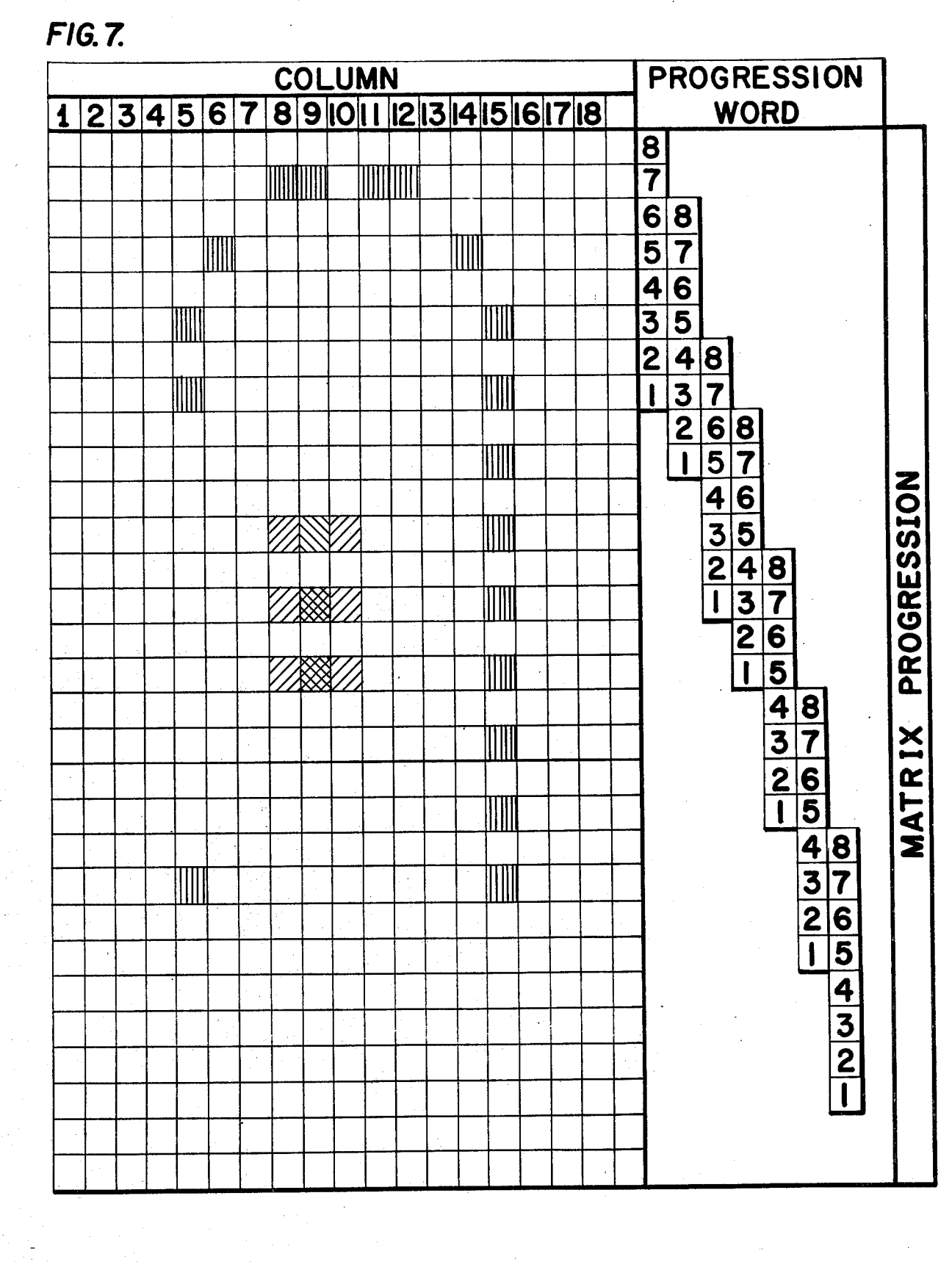

FIG. 7 is similar to FIG. 6 except the bottom segment is missing;

DESCRIPTION OF THE PREFERRED EMBODIMENT

Figure 1:
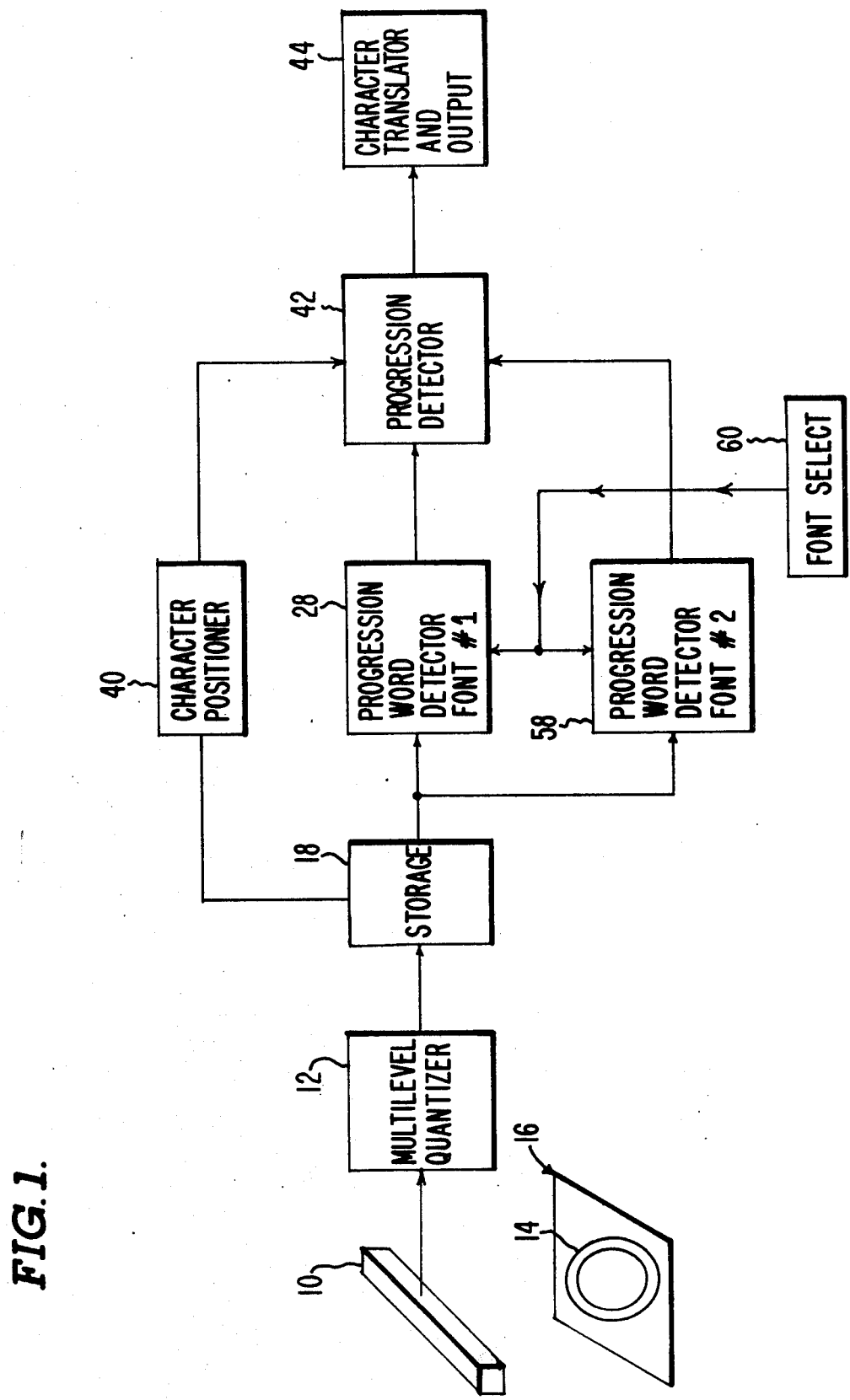
FIG. 1 is a block diagram of one embodiment of the present invention.

Referring now to the drawings wherein like component parts are identified by like reference numerals and in particular to FIG. 1, there is illustrated a block diagram of a character recognition system or apparatus in accordance with the present invention capable of carrying out the instant inventive method.

The apparatus includes generating means defined by a scanning means or scanner 10 and a multi-level quantizing means or multi-level quantizer 12. The scanner 10 and the multi-level quantizer 12 in combination generate binary signals which represent the information content of a geometric pattern corresponding to a presented character 14 on a presented document generally indicated at 16.

The scanner is in operable communication with the presented character 14 that is capable of deriving an array of voltages in the form of a composite analog electrical signal. The composite analog electrical signal or voltage is representative of the configuration of the presented character 14. The analog voltage is a function of the intensity of the light reflected to the scanner 10 from the surface of the presented character 14.

In the preferred embodiment of the subject invention, the scanner 10 includes a near infra red light source which illuminates the document 16 with an infra red light which is reflected from the document and focused by a lense system onto an array of light detectors. The array comprises 50 photodiodes which scan the presented character 14 in vertical sections upon being squentially addressed. One scan of the array takes in one vertical segment of the character. For example, to scan a character thirty thousands inches in heighth, one of the 50 diodes scans a height of six thousands of an inch.

The information obtained from each scan of the photodiode array, which represents the intensity of light received by the array, is developed by a video processor which develops the composite analog electrical signal. A suitable array for such purposes is manufactured by IPL, a corporation of England, and identified as Model PCM-75.

The output of the scanner 10 is coupled to the multilevel quantizer 12. The multi-lever quantizer 12 converts the composite analog electrical signal produced by the scanner 10 into corresponding binary signals. A voltage that exceeds a determined threshold level is converted by the multi-level quantizer 12 to a first binary signal such as a binary "1" and a voltage that is less than the determined threshold level is converted to a second binary signal such as a binary "0". Such quantizing means are well known in the art as further explained in the U.S. patent to Beall et al which is hereby incorporated by reference.

In the preferred embodiment of the instant invention the multi-level quantizer 12 is provided with three discrete quantizing levels to thereby develop three weighted binary signals. Three parallel connected quantizing circuits of known design can be used to produce the three discrete binary signals in response to each serially supplied voltage produced by the scanner 10. An upper quantizing level is provided to develop a first weighted binary signal when the scanner 10 produces a voltage derived from a black or dark area of a presented character. A binary "0" is generated for voltages below the upper quantizing level. Similarly, a low quantizing level is provided to develop a second weighted binary signal when the scaner 10 derives a voltage from a light or white area of a presented character. A binary "0" is generated for voltages above the low quantizing level. Further, an intermediate quantizing level is provided to develop a third weighted binary signal when the scanner 10 derives a voltage from a gray, or color between black and white, area of a presented character. A binary "0" is generated for voltages above the intermediate quantizing level.

A storage means or storage area generally indicated at 18 is adapted to store each of the weighted binary signals produced by the multi-level quantizer 12 to thereby retain field arrays of binary levels, each representing weighted geometric configuration of binary signals that is in approximate conformity with the geometric configuration of the presented character 14.

The storage area 18 includes a black buffer generally indicated at 20, a gray buffer generally indicated at 22, and a white buffer generally indicated at 24. The black buffer 20 serially stores the first weighted binary signals. The gray buffer 22 serially stores the third weighted binary signals. Finally, the white buffer 24 serially stores the second weighted binary signals. Each of the buffers 20, 22 and 24 comprises 18 interconnected programmable length shift registers each of which is 50 bits in length in the preferred embodiment to thereby have the capability of storing the 50 binary bits generated by one scan of the scanner 10 in one column of the buffer. The shift register stages of each of the buffer areas 20, 22 and 24 may be considered to be configured in a N × M matrix array having M columns and N rows. The black buffer 20 is adapted to store the first weighted data field grometric configuration of the presented character. The gray buffer 22 is adapted to store the third weighted data field geometric configuration. The white buffer 24 is adapted to store the second weighted data field geometric configuration.

A shift timer or timing circuit 26 supplies shift pulses simultaneously to each of the buffers 20, 22 and 24 to thereby shift the binary numbers supplied by the multi-level quantizer 12 through each of the shift registers as shown in the Beall et al patent.

Figure 2:
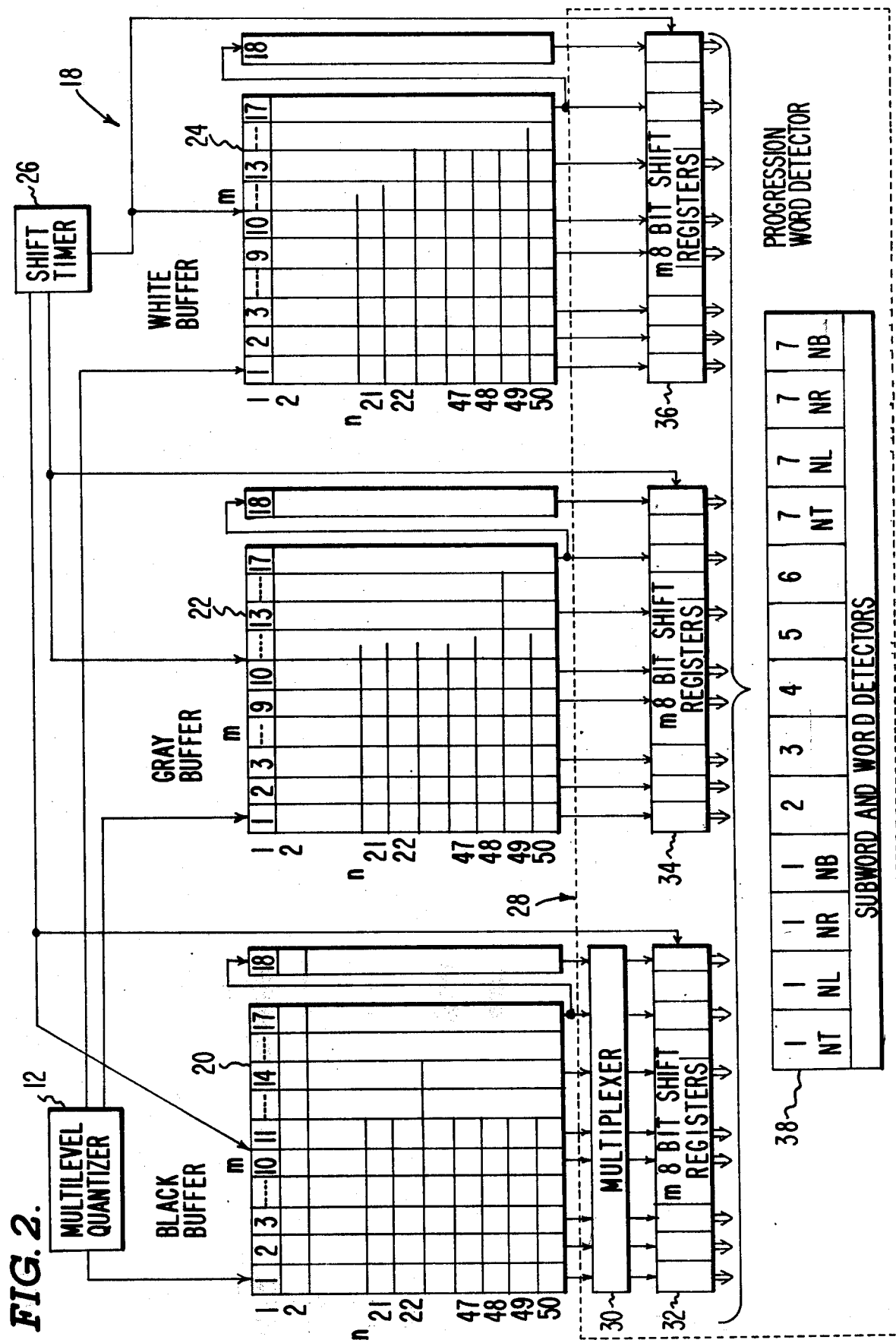
FIG. 2 is a block diagram of a portion of the system illustrated in FIG. 1.

Discrete areas of the data field geometric configuration stored in the black, gray and white buffers 20, 22 and 24, respectively, are examined and thereafter decoded via a progression word detecting means or a progression word detector generally indicated at 28. The progression word detector 28 is coupled to the storage area 18 and is adapted to examine corresponding discrete areas of each weighted data field geometric configuration to determine whether the information content of each examined discrete area is of a predetermined designation. The progression word detector may include a first set of multiplexers 30 (only one of which is shown in FIG. 2) the function of which will be described in greater detail hereinafter. The progression word detector 28 also includes sampling means or a plurality of eight bit shift registers generally indicated at 32, 34 and 36 for simultaneously sampling a plurality of binary words from their respective black, gray and white buffers 20, 22 and 24; the binary words defining neighborhood dependent areas.

As shown in FIG. 2, the shift timer 26 simultaneously shifts the digital signals in the columns of each of the buffer areas into adjacent columns, the last row of one column being shifted into the first row of the adjacent column. Each plurality of shift registers 32, 34 and 36 contain the contents of the last eight rows of each of the buffers 20, 22 and 24 respectively, simultaneously shifted thereinto by the shift timer 26 which at the same time shifts the buffers 20, 22 and 24. The eight bits of each of the shift registers are coupled to preselected ones of word detectors, or first logic means generally indicated at 38. It is clear that at any one time after the entire scanned character is present in each of the buffers, the shift registers 32, 34 and 36 each contain eight matrix binary words representing a cross section of eight rows of the matrix.

As illustrated in FIG. 1, a character positioner 40, similar to the one shown in the Beall et al patent, is coupled to the storage area 18 and also to a progression detector 42. The character positioner 40 is adapted to sense when the array of binary signals serially supplied to the storage area 18 is properly positioned to begin detecting predetermined combinations of detected progression words or progressions. The character positioner 40 is adapted to produce a signal indicating the proper positioning of the weighted data field geometric configurations within the storage area 18 and to apply this signal to an enabling input terminal on the progression detector 42. The progression detector 42, or progression detection means, which will be described in greater detail hereinafter, is inhibited for detecting predetermined combinations of the detected progression words during that period when a substantial amount of invalid progression word identification might occur, i.e. prior to the substantial completion of the scanning operation by the scanner 10.

Also shown in FIG. 1 is a character translator and output circuit 44. The character translator and output circuit 44 is coupled to each of the output terminals of the progression detector 42 at corresponding input terminals, the output terminals of the progression detector 42 corresponding and equal in number to the known type of alphanumeric characters with which presented characters are to be identified. By such coupling of the output terminals of the progression detector to the input terminals of the character translator and output circuit 44, a unique binary coded signal may be generated in response to an energization of a corresponding input terminal, which unique binary coded signal may be sent to a general purpose computer for processing.

The operation of the progression word detector 28 will be described in greater detail hereinafter with reference to FIGS. 3 through 12e but it is sufficient here to say that the progression word detector 28 detects a plurality of binary progression words or progressions by decoding predetermined combinations of the stored binary words. A row of stored binary signals comprises a binary word. The combinations of stored binary words which are subsequently decoded represent overlapping neighborhood dependent areas sampled from different field arrays.

The progression detector 42 will now be described with reference to FIG. 13.

The progression detection circuit 42 includes grouping means or a plurality of multiplexers generally indicated at 46. It is to be understood that for each potentially recognizable character four multiplexers are provided; a "no top" multiplexer 48, a "no left" multiplexer 50, a "no right" multiplexer 52, and a "no bottom" multiplexer 54. As shown in FIG. 13, only the multiplexers for the character "0" are shown. The multiplexers 48 through 54 group predetermined combinations of the detected progression words one through seven including the sub-words "no top", "no left", "no right", and "no bottom" of words one and seven. For example, the "no top" multiplexer groups the "no top" sub-word of progression word one, and the "no top" sub-word of the progression word seven along with the common progression words two through six. In a corresponding fashion the "no left" multiplexer 50 groups the "no left" sub-word of the progression word one and the "no left" sub-word of the progression word seven along with the common progression words two through six. The "no right" multiplexer 52 groups the "no right" sub-word of the progression word one and the "no right" sub-word of the progression word seven along with the common progression words two through six. And finally, the "no bottom" multiplexer 54 groups the "no bottom" sub-word of the progression word one, the "no bottom" sub-word of the progression word seven, and the common progression words two through six.

Figure 13:
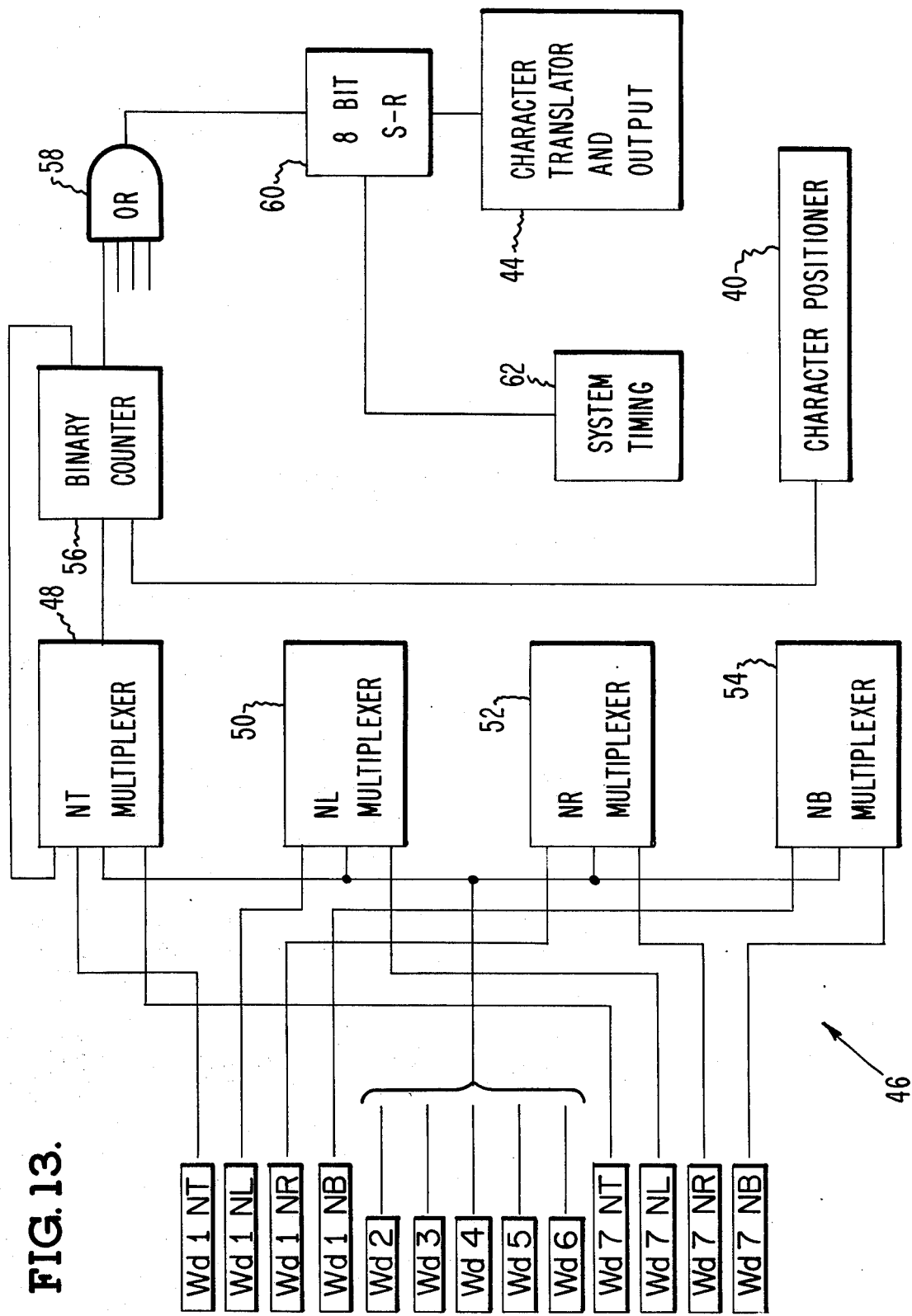
FIG. 13 shows a logic block diagram of a progression detection circuit for detecting predetermined combinations of the detected progression words.

A binary counter 56 is provided for each of the multiplexers 48 through 54, only one of which is shown in FIG. 13, for keeping track of progression times and for storing the fact that a progression word or sub-word of a progression word is found in the right progression time.

Reference is now made to the operation of the binary counter 56 and the multiplexer 48, the understanding of which is sufficient to understand the remainder of the circuit.

The binary counter 56 is initially set to zero upon the reception of a signal from the character positioner 40 as previously noted to indicate that the array is properly positioned within the buffers 20, 22 and 24. Thereafter, the binary counter 46 incrementally counts upward every time the "no top" multiplexer 48 receives an indication from one of the progession word detectors 28 or 58 that either one of the "no top" sub-words or progression words two through six have been received at the proper progession time. For example, if the "no top" sub-word of the first progression word occurs during the first progression at the "no top" multiplexer 48, the binary counter will count from zero to one. In the same fashion, if the "no top" multiplexer 48 senses the occurrence of words two through six during their respective progression times, the binary counter will count from one through five respectively. If the "no top" sub-word of progression word seven also occurs at the "no top" multiplexer 48 during progression seven, the binary counter 56 will enable an OR gate 58 which OR gate 58 in turn enables an eight bit shift register 60 which shift register 60 stores the number of times that the presented character has been read as a predetermined character, there being an eight bit shift register such as register 60 for every potential character. While not shown in FIG. 13, OR gate 58 accepts inputs from each of the binary counters of each of the multiplexers 50, 52 and 54 which also are not shown. Therefore, when any of the binary counters of the multiplexers 48 through 54 count up to seven, OR gate 58 is enabled to place a bit into the eight bit shift register 60. When the character starts to be shifted out of the storage area 18, system timing 62 will send a signal to all the eight bit shift registers 60 to cause them to shift out any bits contained therein. Since there is one eight bit shift register 60 for each possible character to be recognized, the first bit emitted by any of the eight bit shift registers 60 will cause the character translator and output 44 to send out a corresponding coded signal which may be utilized by general purpose computer as previously described.

The progression word detector 28 and the aforementioned second progression word detector 58 will now be described with reference to FIGS. 4 through 12e.

Figure 3:
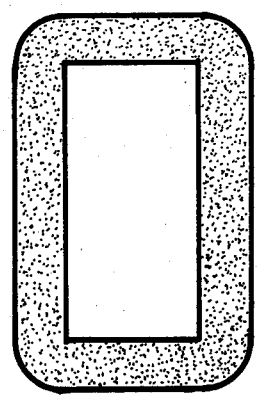
FIG. 3 shows a presented character in its normal and distorted forms, all of which can be recognized by the present invention.
Figure 3:
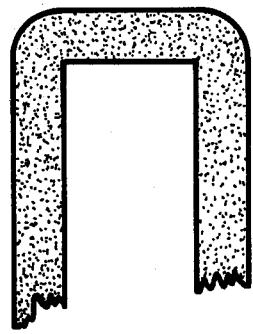
Figure 3:
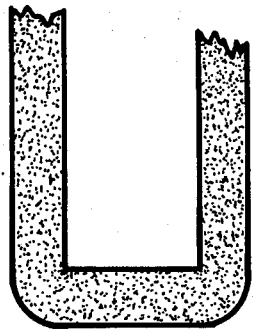
Figure 3:
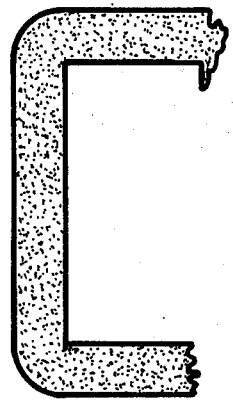
Figure 3:
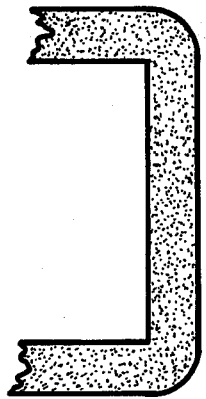

Briefly, FIG. 3 shows a presented character in its normal and cut or segmented form; that character being the character zero. The apparatus of the subject invention and the method of the subject invention utilizing the subject apparatus can not only recognize the normal form of the character zero but also the cut or segmented form of the presented character.

Figure 4:
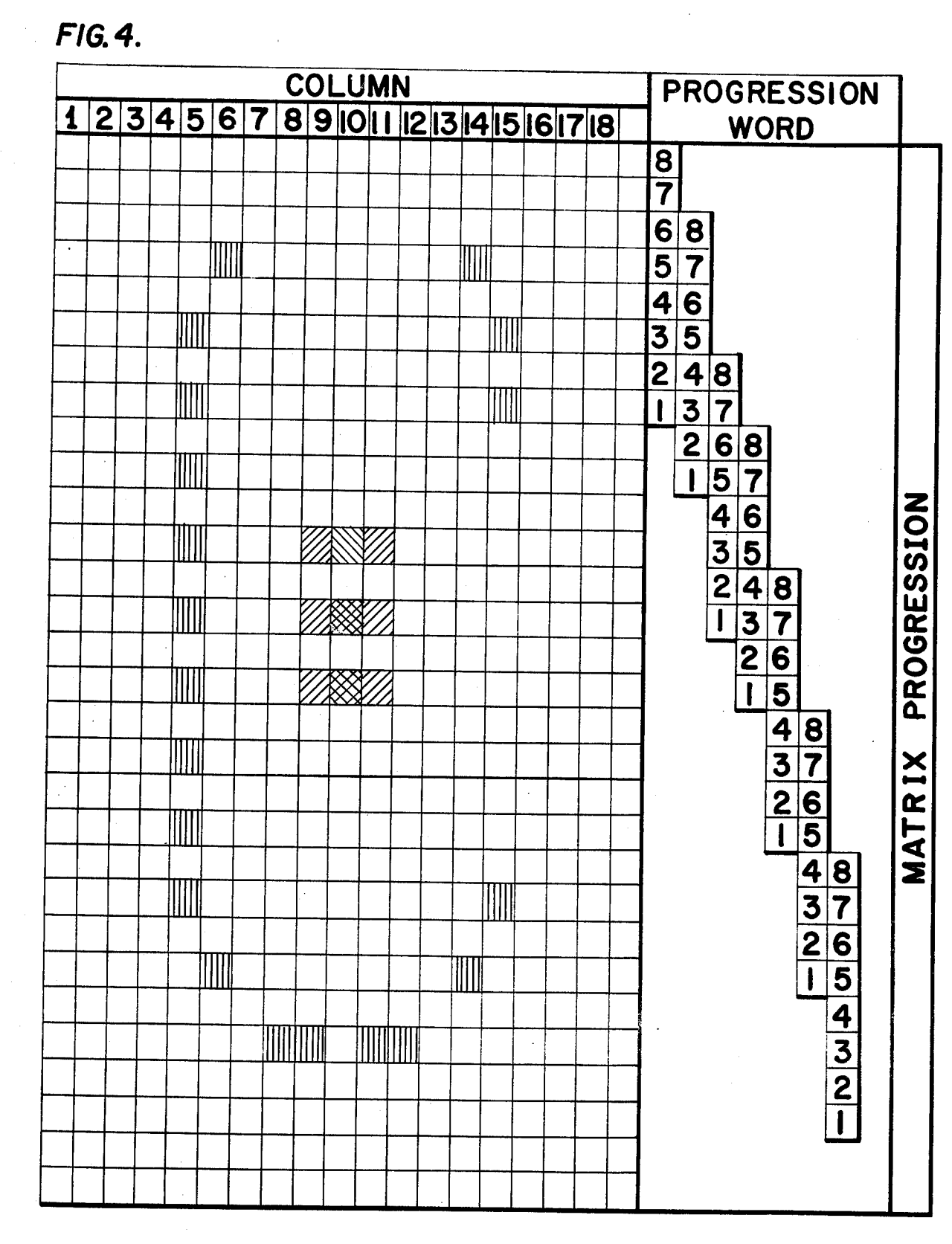

FIG. 4 shows in graphical form the representation of a zero with no top, those squares in which vertical and diagonal lines appear indicate those positions of the matrix of binary signals stored within the pattern buffers 20, 22 and 24 which are sampled by the eight bit shift registers 32, 34 an 36 and thereafter decoded by either one of the progression word detectors 28 or 58. Those squares containing the vertical line segments indicate those positions in which a binary "1" must occur in the black buffer 20. Those squares containing right handed diagonal line segments indicate those positions of the gray buffer 22 in which a binary "1" must occur. Those squares in which the left handed diagonal line segments occur indicate those areas in the black buffer in which a binary "0" must occur.

As shown in FIG. 4, even though the top segment of the character zero is missing, and a portion of the right hand segment of the character zero is missing, there is sufficient information within the two buffers 20 and 22 to recognize the character as the character zero as will be described hereinafter.

The operation of the progression word detector 28 and by analog progression word detector 58 will now be described by going through a decoding operation of the mutilated zero of FIG. 4.

To recognize the mutilated character of FIG. 4 as the character zero, the "no top" sub-word of both the first progression word and the seventh progression word must be detected as well as the common progression words two through six.

Figure 8A:
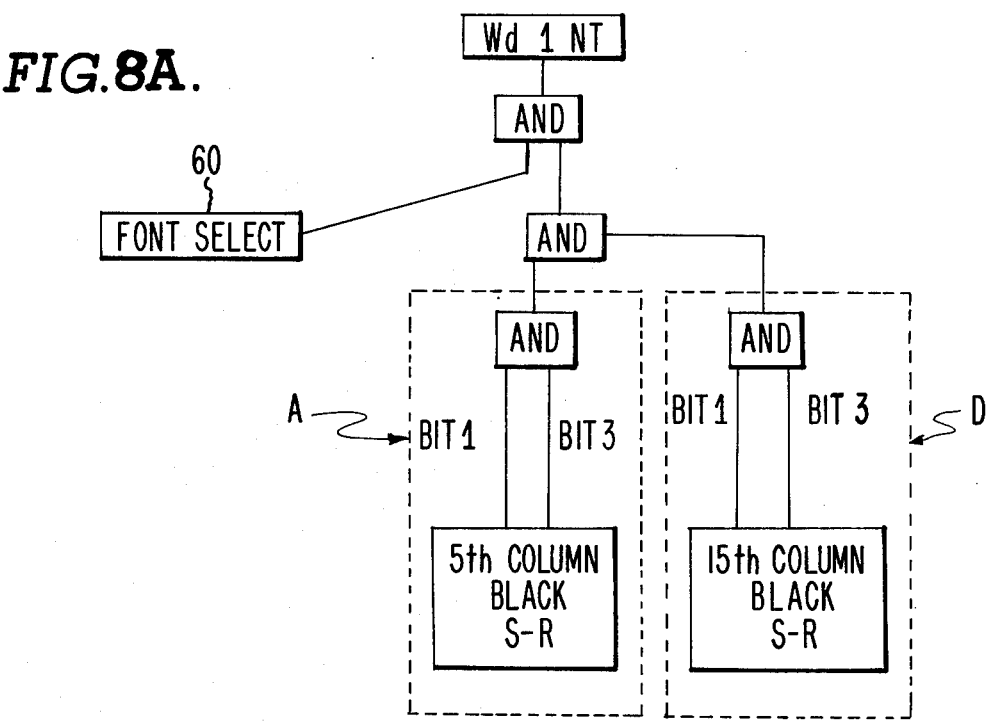
FIG. 8a is a block diagram indicating the logic used to decode certain binary words in the stored area to obtain the "no top" sub-word of the first progression word.
Figure 8B:
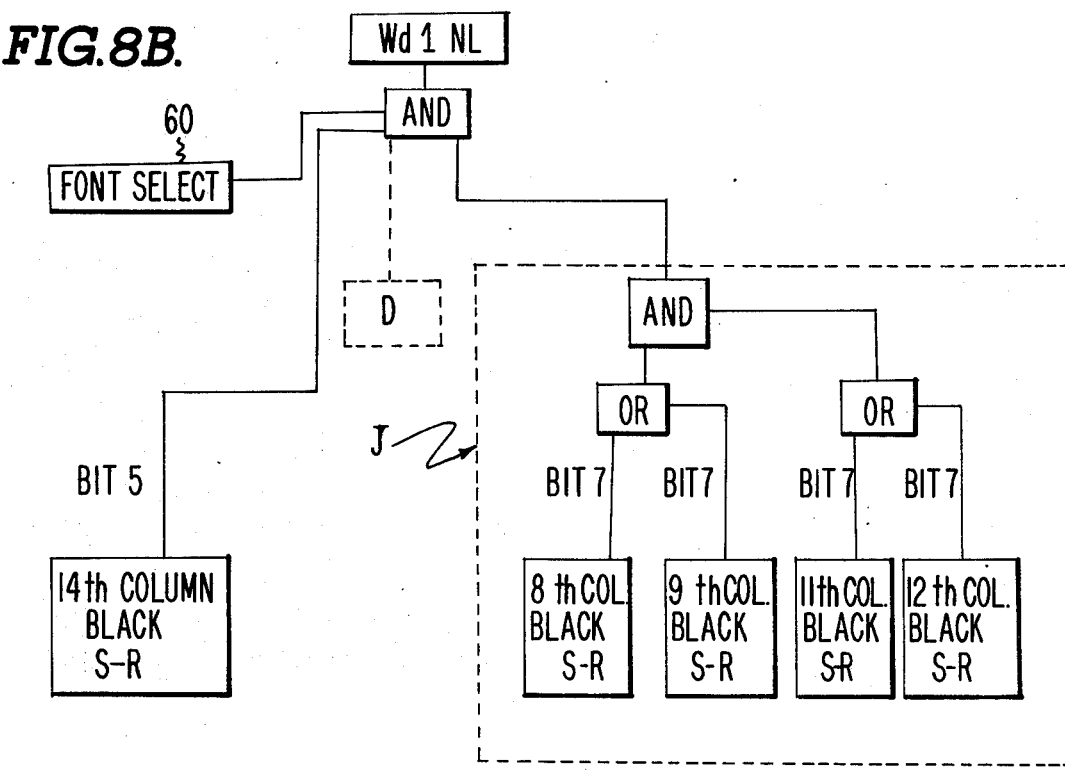
FIG. 8b is similar to FIG. 8a and shows the logic for detecting the sub-word "no left" of the first progression word.
Figure 9A:
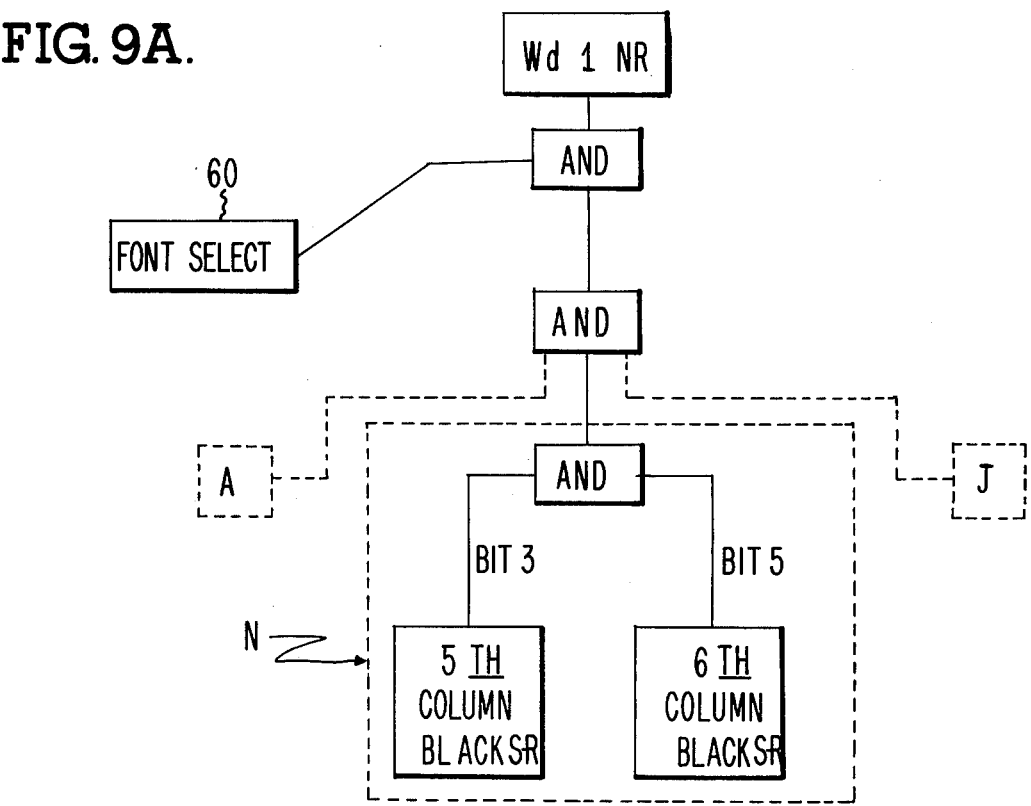
FIG. 9a shows the logic for detecting the "no right" sub-word of the first progression word.
Figure 9B:
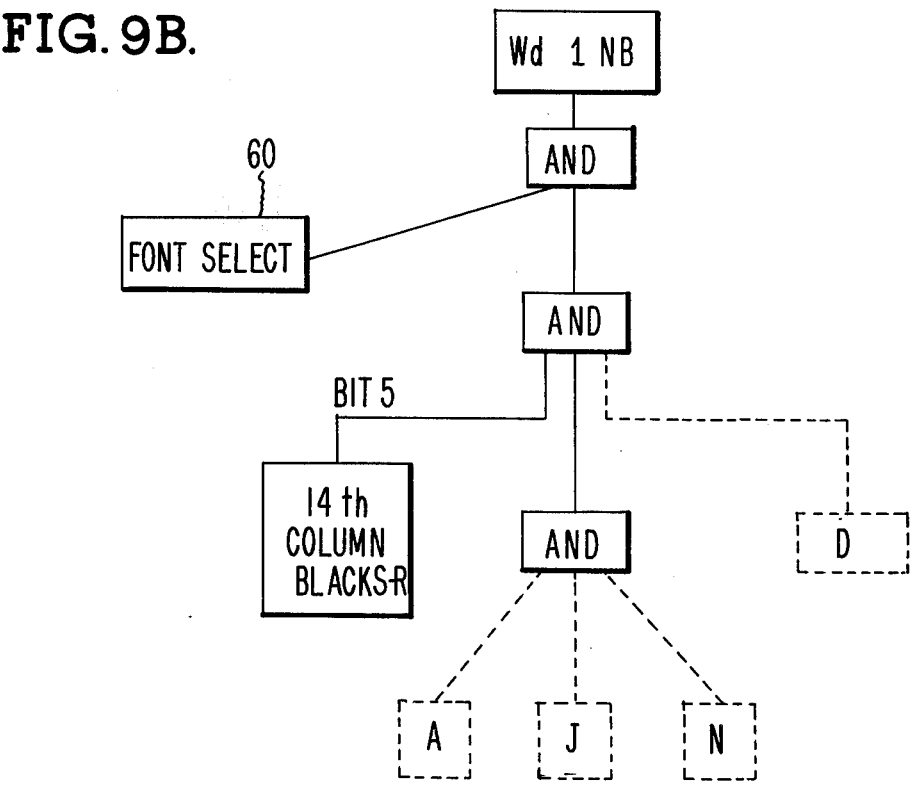
FIG. 9b shows the logic for detecting the "no bottom" sub-word of the first progression word.

The detection process starts when the first eight rows of the matrix shown in FIG. 4 appear in the eight bit shift registers 32, 34 and 36. Consequently, the "no top" sub-word of the first progression word must first be detected within this first progression time period. Referring to FIG. 8a, the first eight bits of the fifth column of the black buffer 20 as it appears in the black register 32 are decoded. In particular, bits one and three must contain a binary one therein as well as bits one and three of the fifteenth column of the black buffer 20. Upon finding a binary one in each of the above mentioned bit areas, and upon the selection by means of a font select 60 through an AND gate, the "no top" sub-word of the first progression word is thereby detected. The font select 60 merely allows the operator of the subject apparatus to select which internal logic is to be used to decode the binary words appearing in the matrix. Thereby different types or forms of the characters presented may be recognized. For example, characters of the form OCRA or OCRB may be recognized by their particular progression word detector 28 or 58 respectively.

Figure 10A:
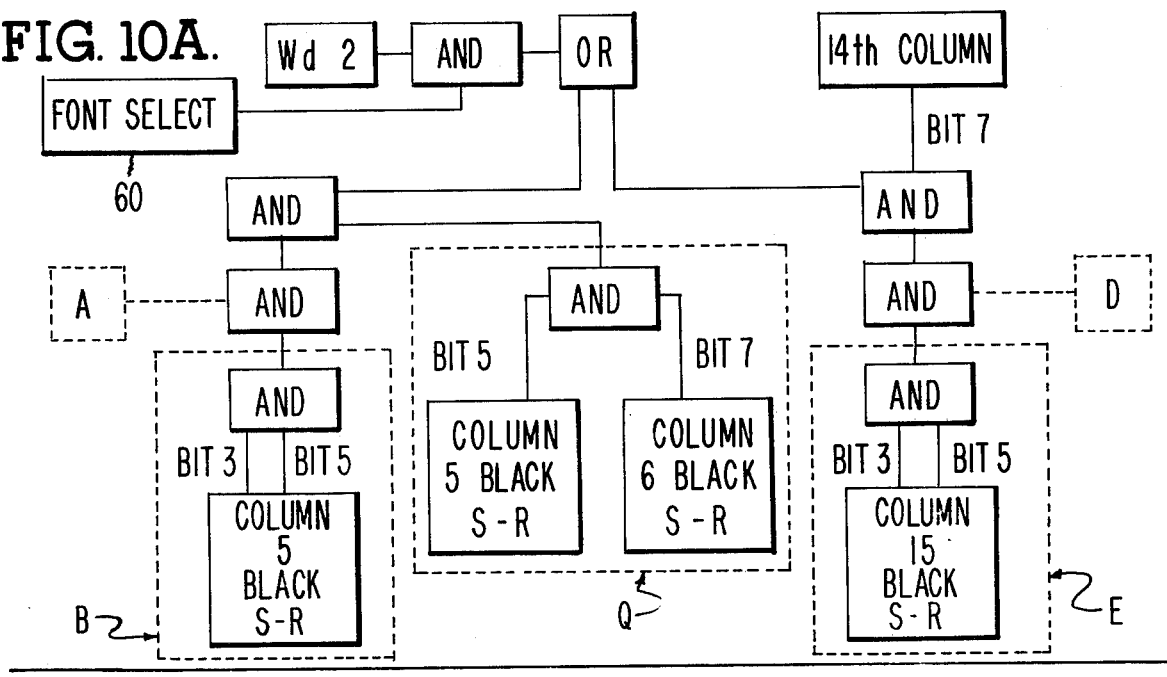
FIG. 10a shows the logic for detecting the second progression word.

During the second progression time period, rows three through ten of the matrix are in the registers 32, 34 and 36 and are interrogated in an attempt to detect the second progression word. FIG. 10a shows the logic used for such a decoding operation. The logic of FIG. 10a requires that either bits one, three and five of column five or column fifteen of the black buffer 20 contain a binary "1" therein. Also bit seven of either column six or fourteen must contain a binary "1" therein in order to detect the second word within the second progression time period.

Figure 10B:
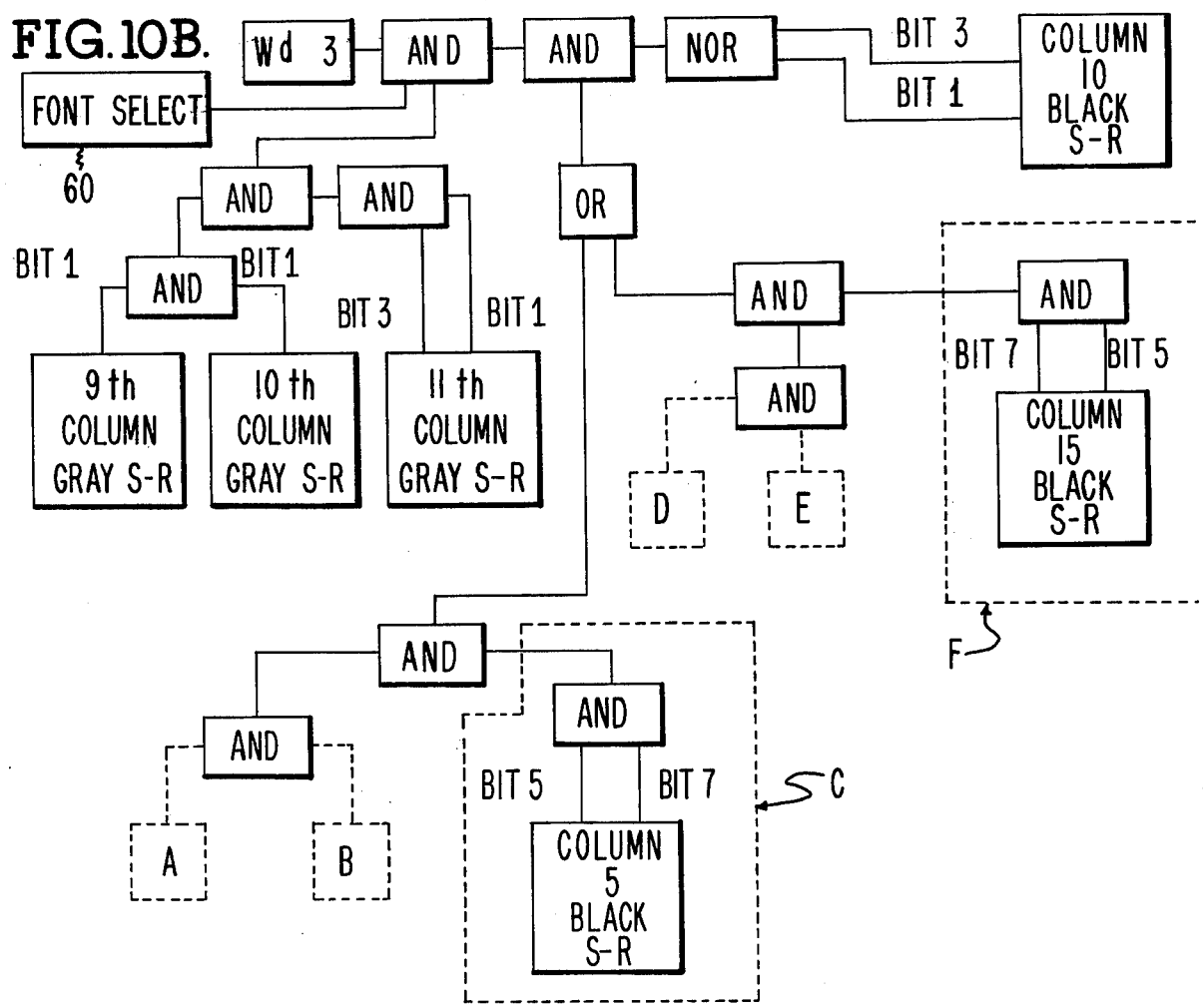
FIG. 10b shows the logic for detecting the third progression word.

Within the third progression time period the third word must be detected from rows seven through fourteen appearing in the registors 32, 34 and 36. The third word logic is shown in FIG. 10b. The logic of FIG. 10b utilizes the binary signals stored in the gray buffer 22. As shown in FIG. 10b, the logic samples or examines the gray buffer 22 by searching for binary ones in the first bit position of the ninth, tenth and eleventh columns and in the third bit position of the eleventh column. The presence of a binary one in these bit positions indicates a lack of black information in these positions. Furthermore, bit positions one and three of the tenth column of the black buffer 20 are decoded to ensure that a binary one (i.e. black information) does not appear in these positions. The logic for detecting the third progression word also decodes by sensing whether bits one, three, five and seven in column five of the black buffer 20 or bits one, three, five and seven in column fifteen of the black buffer 20 are occupied by binary "ones".

Figure 11A:
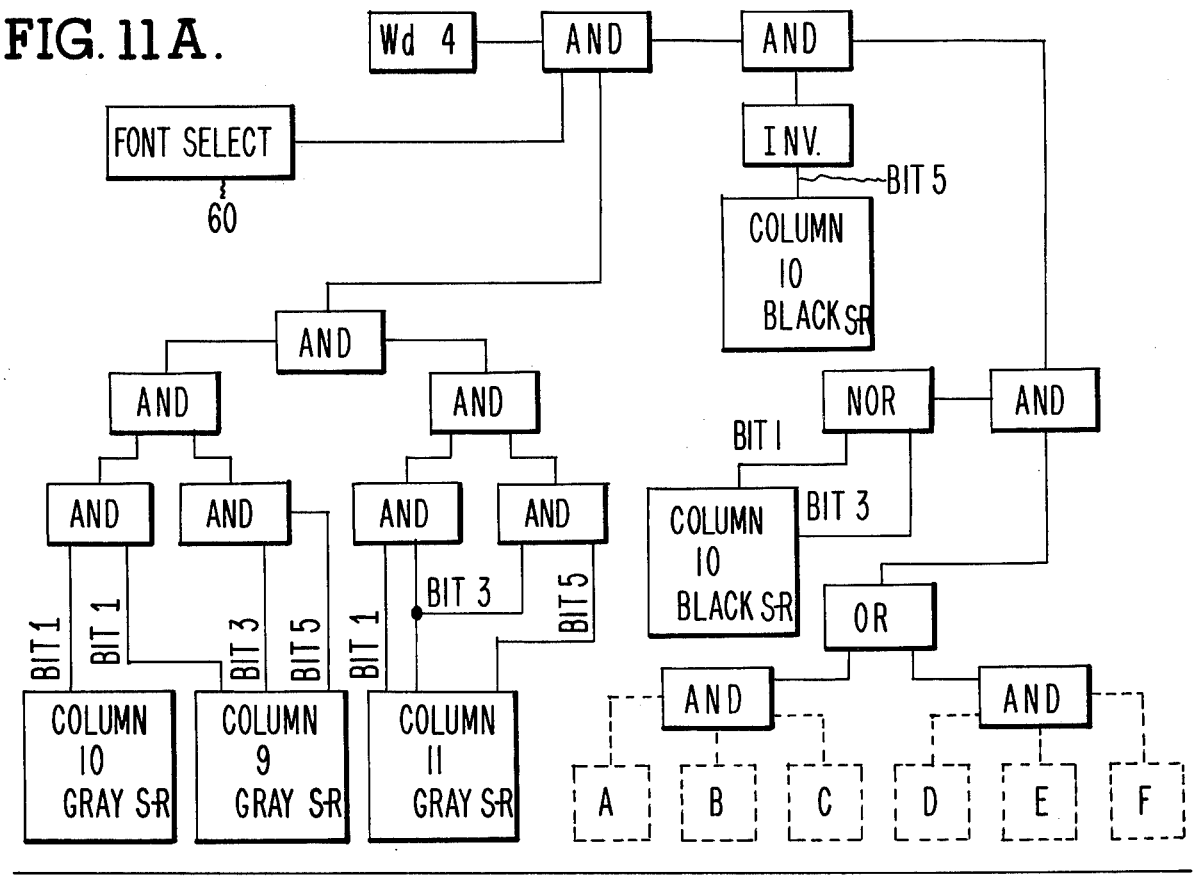
FIG. 11a shows the logic for detecting the fourth progression word.

As shown in FIG. 11a, progression word four is detected when either bits one, three, five and seven of the fifth or fifteenth columns have binary "one" signals therein. In addition, bits one, three and five in the tenth column of the black buffer 20 must be in the logical "zero" state to indicate the absence of black information therein. To insure that there is no black information in the center portion of the character zero, the gray buffer 22 is also sampled at bits one, three and five in columns nine and eleven and bit one in column ten to search for the logical "one" state therein, which logical "one" state indicates that there is no black information at these bit locations.

Figure 11B:
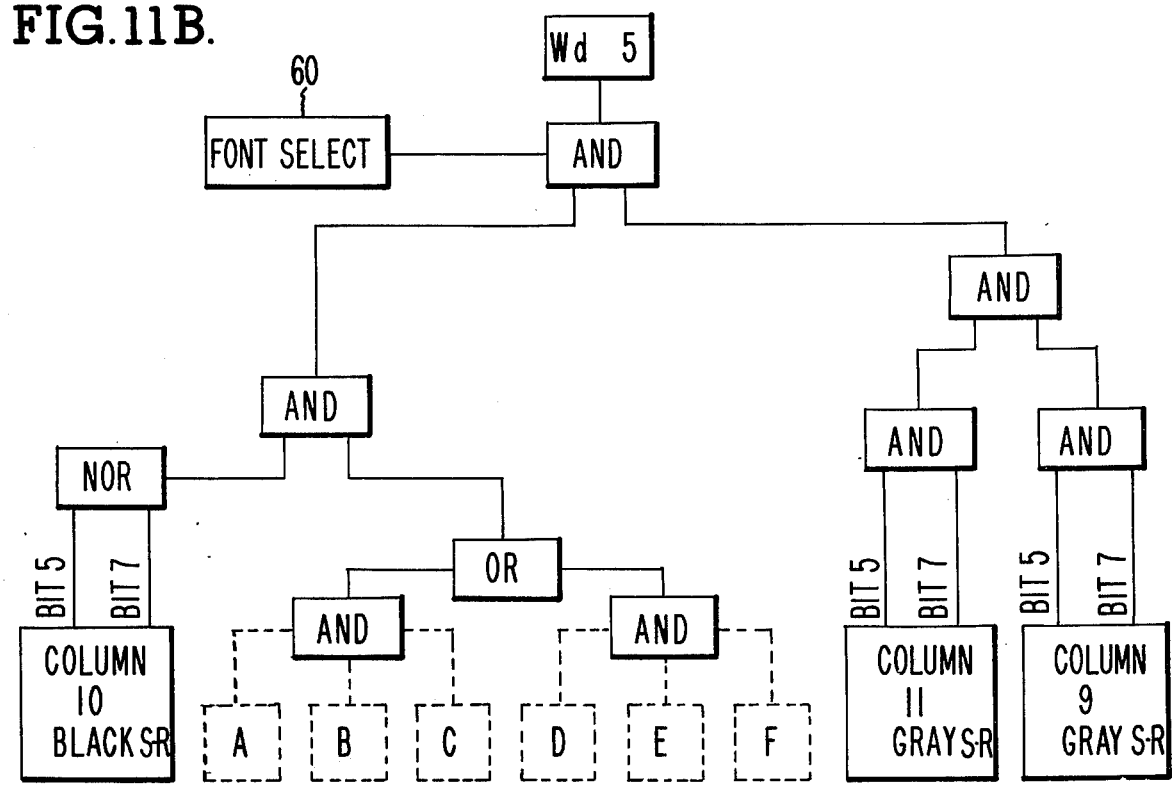
FIG. 11b shows the logic for detecting the fifth progression word.

As shown in FIG. 11b, progression word five is detected in the fifth progression time period when either bit locations one, three, five and seven in either the fifth or fifteenth column are occupied by binary signals representing the logical one state. In addition, bits five and seven in the tenth column of the black buffer 20 must be in the logical zero state. Also, both columns nine and eleven of the gray buffer 22 must have their fifth and seventh bits in the logical one state to thereby indication that no black information appear in this center area.

It is appropriate at this point to mention that although the white buffer 24 and its associated white register 36 are not used in the decoding of the character "zero", such use is made of other characters and furthermore could be used for the character "zero" to lower the substitution rate of the system while increasing the reject rate. For example, by decoding the center of the array of the white buffer 24 it can be assured that a progression word will not be detected unless that center portion contains binary "ones" or almost completely white information. When only the gray buffer 22 and its associated register 34 are decoded, gray areas may appear in the center of a "zero" and the "zero" can still be recognized as a "zero". It can readily be seen that the use of the white buffer 24 and its associated register 36 enable further definition of the stored array.

Figure 12A:
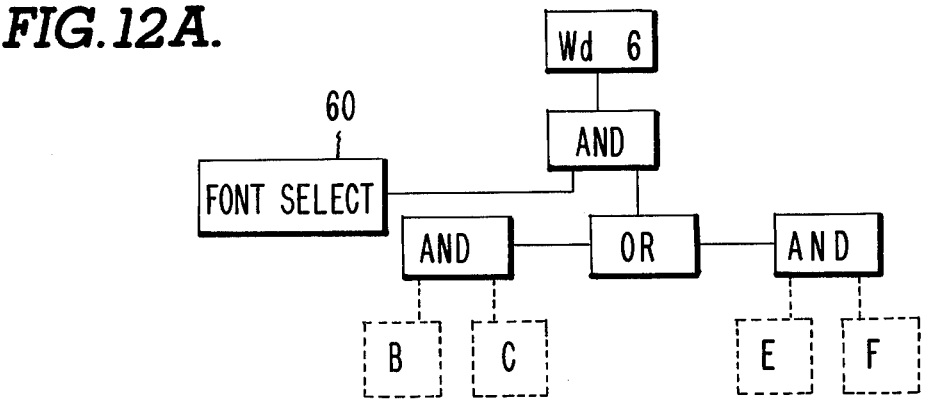
FIG. 12a shows the logic for detecting the sixth progression word.

As shown in FIG. 12a, progression word six is detected within the sixth progression time period when either bits three, five and seven of the fifth or fifteenth column are in the logical one state thereby indicating that black information exists at these bit locations in the matrix shown in FIG. 4.

Figure 12B:
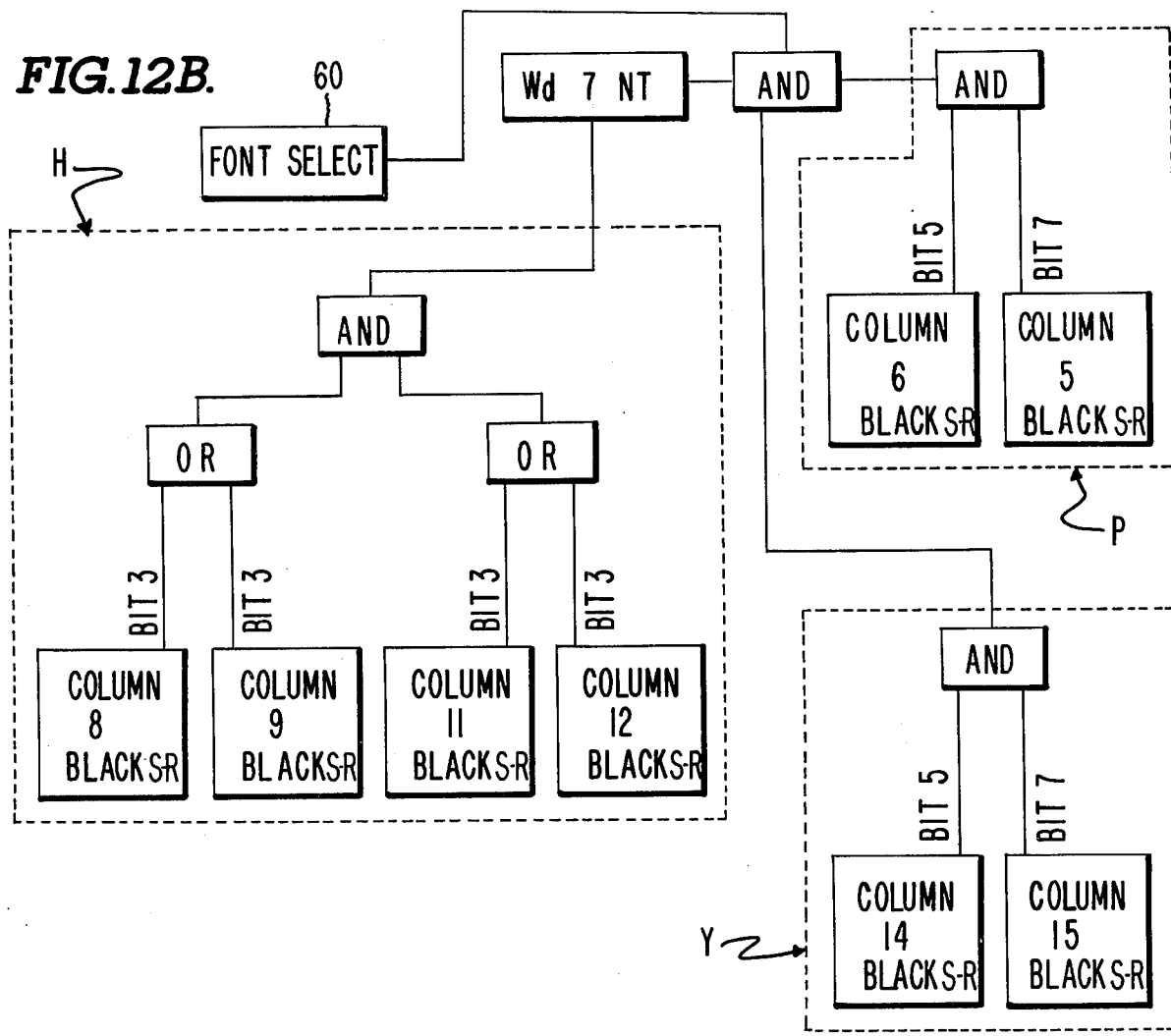
FIG. 12b shows the logic for detecting the "no top" sub-word of the seventh progression word.
Figure 12C:
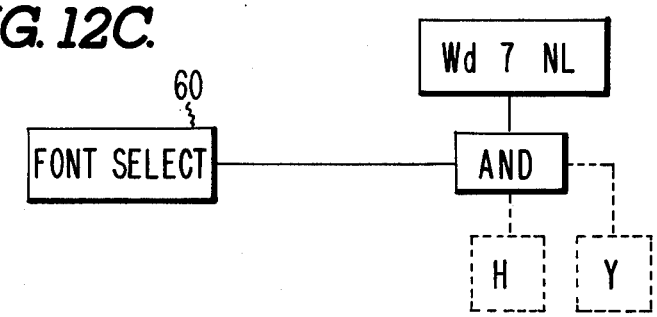
FIG. 12c shows the logic for detecting the "no left" sub-word of the seventh progression word.
Figure 12D:
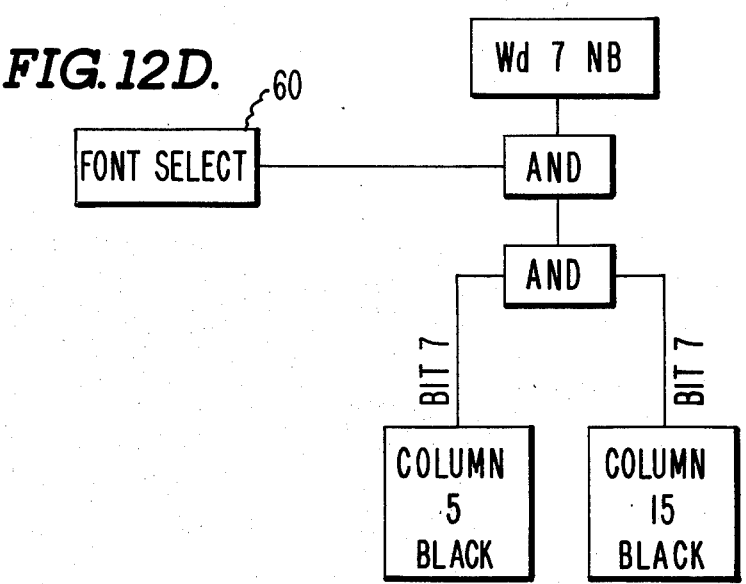
FIG. 12d shows the logic for detecting the "no bottom" sub-word of the seventh progession word.
Figure 12E:
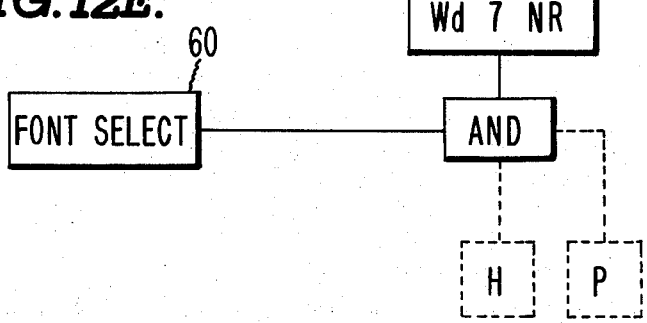
FIG. 12e shows the logic for detecting the "no right" sub-word of the seventh progression word.

A "no tap" sub-word of the seventh progression word is detected as shown in FIG. 12b within the seventh progression time period when bit seven of column five, bit five of column six, bit five of column fourteen, and bit seven of column all contain a binary signal indicating the logical one state. In addition, either bit three of column eight or bit three of column nine must have a binary signal indicating the logical one state contained therein as well as bit three of column eleven, or bit three of column twelve.

As previously described, the detected words and sub-words are now grouped at the multiplexers of the progression detector circuit 42.

Therefore, it can be seen that a presented character such as the character "zero" can be recognized as the character "zero" even though it is multilated to the extent that it has no top segment.

Although only the detection of character "zero" with "no top" was described, it can easily be seen with reference to FIGS. 5, 8b, 10a through 12a, and 12c; FIGS. 6, 9a, 10a through 12a and 12e; and FIGS. 6, 9b, 10a through 12a and 12d, how the character "zero" with "no left", "no right" and "no bottom" segments, respectively, can be detected.

As attended to earlier herein the progression word detector 28 includes multiplexers 30, only one of which is shown. The inclusion of the multiplexers 30 allows for the reverse reading of the presented character when desired. In other words, the multiplexers 30, when included and actuated, reverses the order of the columns in the registers 32, 34 and 36 so that the rows of columns 18 appear in the first eight bit shift register of the registers 32, 34 and 36 and so on.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of identifying a presented character comprising the steps of:
   generating binary signals representing the information content of a geometric pattern corresponding to the presented character;
   storing the binary signals in a data field array which defines a matrix of progressions, each progression overlapping the preceding progression whereby each progression is associated with every other progression, the data field array being in approximately conformity with the geometric pattern of the presented character;
   decoding predetermined combinations of the binary signals, each of the predetermined combinations representing a progression, the combinations further representing overlapping neighborhood dependent areas; and
   detecting predetermined combinations of the detected progressions from which detected progressions the presented character is recognized as a known type.

2. A method of identifying a presented character comprising the steps of:
   generating weighted binary signals representing the information content of a geometric pattern corresponding to a presented character;
   storing the weighted binary signals in a plurality of data field arrays, each data field array defining a matrix of progressions, each progression overlapping the preceding progression whereby each progression is associated with every other progression, the data field arrays being in approximate conformity with the geometric pattern of the presented character;
   decoding predetermined combinations of the binary signals, each of the predetermined combinations representing one of the progressions, the combinations further representing overlapping neighborhood dependent areas, the combinations being decoded from different field arrays; and
   detecting predetermined combinations of the detected progressions from which detected progressions the presented character is recognized as a known type.

3. The method of claim 2 wherein said step of decoding includes the step of sampling the neighborhood dependent areas which define a plurality of binary signals in a unique progression time.

4. The method of claim 3 wherein said step of decoding includes the step of correlating each of said plurality of sampled binary signal with a first set of predetermined progressions.

5. The method of claim 4 wherein said step of detecting includes the step of grouping predetermined combinations of the detected progressions.

6. The method of claim 5 wherein said step of detecting includes the step of monitoring the grouping of a detected progression during the proper progression time.

7. The method of claim 2 wherein said step of generating includes the steps of generating an array of voltages representing the information content of the geometric pattern corresponding to the represented character and quantizing the array of generated voltages at plural quantizing levels to form a corresponding plurality of weighted data field geometric configurations.

8. An apparatus for recognizing a presented character comprising:
   generating means for generating binary signals representing the information content of a geometric pattern corresponding to the presented character;
   storage means coupled to said generating means for storing said binary signals, said binary signals representing a data field array that is in approximate conformity with the geometric pattern of the presented character, said data field array defining a matrix of progressions, each progression overlapping the preceding progression whereby each progression is associated with every other progression;
   progression word detecting means for detecting the progressions by decoding predetermined combinations of said stored binary signals, each of said predetermined combinations representing a progression, said combinations representing overlapping neighborhood dependent areas from said field array; and
   progression detection means for detecting predetermined combinations of said detected progressions from which detected progressions said presented character is recognized as a known type.

9. An apparatus for recognizing a presented character comprising:
   generating means for generating weighted binary signals representing the information content of a geometric pattern corresponding to the presented character;
   storage means coupled to said generating means for storing said weighted binary signals, said weighted binary signals representing a plurality of data field arrays that are in approximate conformity with the geometric pattern of the presented character, each of said data field arrays defining a matrix of progressions, each progression overlapping the preceding progression whereby each progression is associated with every other progression;

progression word detecting means for detecting the progressions by decoding predetermined combinations of said stored binary signals, each of said predetermined combinations representing a progression, said combinations representing overlapping neighborhood dependent areas from different field arrays; and progression detecting means for detecting predetermined combinations of said detected progressions from which detected progressions the presented character is recognized as a known type.

10. The apparatus as defined in claim 9 wherein said progression word detecting means includes sampling means for sampling a plurality of binary signals defining a neighborhood dependent area from said storage means, each of said plurality of binary signals being sampled from said field arrays in a unique progression time.

11. The apparatus as defined in claim 10 wherein said generating means includes scanning means for scanning the presented character in a predetermined sequence and wherein said progression word detecting means includes reversal means for reversing the order of said sampling thereby allowing said scanning means to reverse said predetermined scanning sequence.

12. The apparatus as defined in claim 10 wherein said progression word detecting means includes first logic means for correlating each of said plurality of sampled binary signals with a first set of predetermined progressions, said progression word detecting means providing an indication of a determined correlation.

13. The apparatus as defined in claim 12 wherein said progression word detecting means includes a second logic means for correlating each of said plurality of binary signals with a second set of predetermined progressions, and selector means for selecting one of said first and second logic means to thereby allow said apparatus to recognize a second configuration of the presented character.

14. The apparatus as defined in claim 12 wherein first logic means comprises a plurality of logic gates and wherein the overlapping portions of neighborhood dependent areas are correlated by common logic gates.

15. The apparatus as defined in claim 9 wherein said generating means includes scanning means for generating an array of voltages representing the information content of the geometric pattern corresponding to the presented character and multi-level quantizing means coupled to said scanning means for quantizing said array of voltages at plural quantizing levels to form a corresponding plurality of weighted data field geometric configurations consisting of rows of binary signals, each of said weighted data field geometric configurations representing the scanned pattern thereby differentiating between a plurality of colors ranging between black ad white of a presented character.

16. The apparatus as defined in claim 14 wherein said progression detection means includes grouping means for grouping predetermined combinations of said detected progressions.

17. The apparatus as defined in claim 14 wherein at least two of said detected progressions include a plurality of sub-words, the sub-words of a particular progression being correlated at the same progression time and wherein said progression detection means includes grouping means for grouping corresponding ones of said sub-words and progressions to thereby allow the recognition of a presented character having one of a top segment, a side segment and a bottom segment missing.

18. The apparatus as defined in claim 17 wherein said progression detection means includes monitoring means, responsive to the arrival of a detected progression at said grouping means during the proper progression time, for monitoring progression times and for providing an indication when the predetermined combination of detected progressions and sub-words arrive at said grouping means during the proper progression times.

19. The appartus as defined in claim 18 wherein said progression detection means includes recording means for recording the number of indications provided by said monitoring means, said recording means indicating the number of times said apparatus interprets the geometric pattern to be the presented character.

* * * * *